US007418139B2

United States Patent
Higaki

(10) Patent No.: US 7,418,139 B2
(45) Date of Patent: *Aug. 26, 2008

(54) CONTOUR EXTRACTION APPARATUS, CONTOUR EXTRACTION METHOD, AND CONTOUR EXTRACTION PROGRAM

(75) Inventor: Nobuo Higaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 76 days.

This patent is subject to a terminal disclaimer.

(21) Appl. No.: 10/563,064

(22) PCT Filed: Jul. 1, 2004

(86) PCT No.: PCT/JP2004/009325

§ 371 (c)(1),
(2), (4) Date: Jun. 12, 2006

(87) PCT Pub. No.: WO2005/004060

PCT Pub. Date: Jan. 13, 2005

(65) Prior Publication Data

US 2007/0086656 A1    Apr. 19, 2007

(30) Foreign Application Priority Data

Jul. 1, 2003    (JP)    ............................. 2003-270070

(51) Int. Cl.
G06K 9/48    (2006.01)

(52) U.S. Cl. ....................................... 382/199; 382/173

(58) Field of Classification Search ................. 382/199, 382/170, 173

See application file for complete search history.

(56) References Cited

U.S. PATENT DOCUMENTS 5,487,116 A * 1/1996 Nakano et al. .............. 382/104

(Continued)

FOREIGN PATENT DOCUMENTS

JP    08-329254    12/1996

(Continued)

OTHER PUBLICATIONS

International Search Report, PCT/JP2004/009325, Jul. 14, 2004, 2 pages.

(Continued)

*Primary Examiner*—Samir A. Ahmed
*Assistant Examiner*—Michael Vanchy, Jr.
(74) *Attorney, Agent, or Firm*—Fenwick & West LLP

(57) ABSTRACT

To provide a contour extraction apparatus which can perform much more quickly the contour division when required while reducing the cost for computing. In contour extraction unit 32: a plurality of nodes are located on a periphery of the target object by the node locator 32A; the contour, which is formed by connecting nodes at a predetermined connection order, is deformed by the contour deformation unit 32B; an internode distance about all combination of nodes excepting the inter node distance between adjacent nodes is computed by the internode distance calculator 32C; it is checked by the connection creator 32D whether or not the combination of nodes whose internode distance is below a first threshold value exists, a connection line to divide the contour is created, the connection line connects one of nodes in the combination with the node adjacent to the other node in the combination, and the node adjacent to the other node is the node being positioning upstream or downstream in the predetermined connection order with respect to the other node.

10 Claims, 12 Drawing Sheets

U.S. PATENT DOCUMENTS

| | | | | |
|---|---|---|---|---|
| 5,590,261 | A | * 12/1996 | Sclaroff et al. | 345/473 |
| 5,940,527 | A | * 8/1999 | Takeo | 382/132 |
| 6,031,935 | A | * 2/2000 | Kimmel | 382/173 |
| 6,256,411 | B1 | * 7/2001 | Iida | 382/203 |
| 6,272,233 | B1 | * 8/2001 | Takeo | 382/128 |
| 6,920,248 | B2 | * 7/2005 | Higaki | 382/199 |
| 2002/0031265 | A1 | * 3/2002 | Higaki | 382/199 |
| 2003/0076319 | A1 | * 4/2003 | Hiraga | 345/420 |
| 2004/0028260 | A1 | * 2/2004 | Higaki et al. | 382/118 |

FOREIGN PATENT DOCUMENTS

| | | |
|---|---|---|
| JP | 09-270014 | 10/1997 |
| JP | 2002-92622 | 3/2002 |

OTHER PUBLICATIONS

Sagako, M. et al., "Investigation About the Determination of SNAKE Parameter," Institute of Electronics Information and Communication Engineers, Technical Investigation Report (PRU90-21), 1986, pp. 43-49.

* cited by examiner

DISTANCE IMAGE P1

DIFFERENCE IMAGE P2

EDGE IMAGE P3

DETERMINATION OF TARGET DISTANCE D1

GENERATION OF TARGET DISTANCE IMAGE P4

DETERMINATION OF TARGET REGION A(1)

DETERMINATION OF TARGET REGION A(2)

ARRANGING NODES Pi (i=1,2,···,n)

DEFORMING CONTOUR V

MEASURING INTERNODE DISTANCE D2

MEASURING INTERNODE DISTANCE D2
FROM NODE $P_1$ TO $P_3, P_4, \cdots, P_{n-1}$, RESPECTIVELY.

MEASURING INTERNODE DISTANCE D2
FROM NODE $P_2$ TO $P_4, P_5, \cdots, P_n$, RESPECTIVELY.

MEASURING INTERNODE DISTANCE D2
FROM NODE $P_{n-2}$ TO $P_n$

SEARCHING COMBINATION ($P_a$, $P_b$) OF NODES $P_i$ THAT SATISFIES D2 ≦ D3.

CREATING CONNECTION LINES L1 AND L2.

DIVIDING CONTOUR V INTO CONTOURS V1 AND V2.

RELEVANT ART

RELEVANT ART

RELEVANT ART

RELEVANT ART

RELEVANT ART

CONTOUR EXTRACTION APPARATUS, CONTOUR EXTRACTION METHOD, AND CONTOUR EXTRACTION PROGRAM

CROSS REFERENCE TO RELATED APPLICATIONS

This application claims priority to International Application No. PCT/JP2004/009325, entitled "Contour Extracting Device, Contour Extracting Method, and Contour Extracting Program", filed Jul. 1, 2004, which claims priority to Japanese Patent Application No.: 2003-270070, filed on Jul. 1, 2003.

FIELD OF THE INVENTION

The present invention relates to an apparatus, method, and program for extracting a contour of a target object from images obtained by an image pickup of a target object using a camera.

DESCRIPTION OF RELEVANT ART

An active contour model based method, which is called as "snakes" and uses a closed circle, has been known as a method for extracting a contour of a target object from images, which are obtained by an image pickup of the target object using cameras. Hereinafter this method is called as "snake method".

The snake method is a method for extracting a contour of a target object by deforming the closed circle so that the predefined energy function becomes minimum. To be more precise, in this method, the contour of the target object is roughly defined. Then, the contour of the target object is extracted by repeating the deformation and contraction of the contour till the energy function of formula (1) becomes below a predetermined threshold value.

$$E_{snakes} = \int \{E_{int}(p(s)) + E_{image}(p(s)) + E_{con}(p(s))\} ds \quad (1)$$

In formula (1), "$p(s)$" denotes a node which constitutes the contour, "$E_{int}(p(s))$" denotes "internal energy" which indicates the smoothness of the contour, "$E_{image}(p(s))$" denotes "image energy" which indicates a luminance gradient etc. of the image, and "$E_{con}(p(s))$" denotes "external energy" which indicates a force to be applied from an outside to the contour.

In the snake method, however, following defects are known:

the contour of the target object cannot be accurately extracted when a plurality of target objects exist in image or when the proximate contour of the target object is not defined beforehand; and the contour of the target object and the contour of other obstacle are extracted as a single contour when the target object is in the vicinity of other obstacles or when the target object and the obstacle overlap each other on image.

In order to overcome these defects, there is proposed a technique which divides a single contour into two new contours when the line segment which connects adjacent nodes intersects with other line segment (see patent literature 1 and patent literature 2).

To be more precise, the connection line between nodes $P_a$ and $P_{a+1}$ and the connection line between nodes $P_b$ and $P_{b+1}$ are disconnected (see FIG. 11B), when the line segment between $P_a$ and $P_{a+1}$ intersects with the line segment between $P_b$ and $P_{b+1}$ (see FIG. 11A). Then, the connection line L1 connecting node $P_a$ with node $P_{b+1}$ and the connection line L2 connecting node $P_b$ with node $P_{a+1}$ are established. Thereby, the contour V is divided into two contours (contour V1 and contour V2).

Here, the judgment of whether or not the line segment between $P_a$ and $P_{a+1}$ intersects with the line segment between $P_b$ and $P_{b+1}$ is performed by checking whether or not "p" and "q" satisfy the following relations, under the assumption that the coordinates of node are denoted by $(x_i, y_i)$. Here, "p" and "q" are the solution of $p(P_{a+1}-P_a)+P_a=q(P_{b+1}-P_b)+P_b$.

When the following relations are satisfied, it is judged an intersection point exists.

$$P((y_{b+1}-y_a)(x_a-x_b)+(x_b-x_{b+1})(y_a-y_b))/det$$

$$q((y_{a+1}-y_a)(x_a-x_b)+(x_a-x_{a+1})(y_a-y_b))/det$$

$$det=(x_a-x_{a+1})(y_{b+}-y_b)-(x_{b+1}-x_b)$$

$$0 \leq p \leq 1 \text{ and } 0 \leq q \leq 1$$

Additionally, the following technique is disclosed in non-patent literature 1.

In this technique:

(1) during the convergent calculation of Snake, the distance between adjacent elements (nodes) of snake is adjusted when the contour is initially established so that each distance between adjacent elements becomes equal (see FIG. 12A), and then the distance after adjustment is denoted by "Lelm";

(2) the distance between elements is computed for all nodes of snake, and two elements Pa and $P_b$ (Pa and $P_b$ are not adjacent element) whose distance therebetween is shortest and is below the distance (Lelm) is searched from among the computed results;

(3) when the shortest distance is below a predetermined threshold value, the contour is divided into two closed circles (Snakes). Here, one of the closed circles (Snake) is formed by connecting each node from $P_a$ to $P_b$ in a counterclockwise order in FIG. 12B, and the other of closed circles (Snake) is formed by connecting each node from $P_a$ to $P_b$ in a clockwise order in FIG. 12B.

(4) Then, the overall length of each circle (Snake) is computed and is divided into n-equal sections. Next, the position of each element is adjusted so that each section between elements becomes equal each other. Thus, the circle (Snake) is divided into two circles (Snakes). Then, the processing from (1) to (4) is repeated on each new circle (Snake).

[Patent literature 1]
Japanese unexamined patent publication No.H8-329254.

[Patent literature 2]
Japanese unexamined patent publication No.H9-270014.

[Non patent literature 1]
SAKAGUCHI, MINO, AND IKEDA "investigation about the determination of SNAKE parameter" Institute of Electronics, Information and Communication Engineers, technical investigation report (PRU90-21), P 43-P 49.

However, the conventional method, which is disclosed in patent literature 1 or 2 and is used for dividing the contour, requires huge calculation costs. Additionally, in the case of the method disclosed in non-patent literature 1, the threshold value about the distance between elements of the contour cannot be determined easily. This is because the size of the target object on image varies in accordance with the distance from the camera and it is difficult to determine the threshold value without loosing versatility.

Therefore, the present invention intends to provide an apparatus, method, and program which can perform, while saving the calculation costs, much more quickly the contour division processing when required. Furthermore, the present invention intends to provide an apparatus, method, and program which can perform flexibly a plurality of processing for dividing the contour irrespective of the distance to the target object.

SUMMARY OF THE INVENTION

The contour extraction apparatus of the present invention relates to an apparatus for extracting at least one contour of a target object from images obtained by an image pickup of the target object by cameras. In this apparatus the contour is formed from a plurality of nodes; the contour is deformed by shifting the position of each node so that a predetermined energy function becomes minimum; the connection line is created between the nodes when the internode distance between these nodes is below a threshold value which is defined in accordance with the distance to the target object; and the contour is divided by this connection line.

In this apparatus, the contour is formed by a plurality of nodes, and the position of each node is shifted so that a predetermined energy function becomes minimum, when internode distance between nodes is below a threshold value. Here, this threshold value is defined in accordance with the distance to the target object. Then, the connection line is created between these nodes, and the contour is divided by this connection line.

The other aspect of the present invention relates to a contour extraction apparatus for extracting at least one contour of a target object from images obtained by an image pickup of the target object by cameras.

This apparatus includes: a node locator locating a plurality of nodes on a periphery of a region, which includes therein the target object and is defined within the image; a contour deformation unit deforming the contour, which is formed by connecting nodes at a predetermined connection order, by shifting the position of each node to the position where a predefined energy function becomes minimum; an internode distance calculator measuring internode distances about all combination of nodes constituting the contour excepting the internode distance between adjacent nodes; and a connection creator creating a connection line to divide the contour when a combination of nodes whose internode distance is below a first threshold value exists. The connection line connects one of nodes in the combination with the node adjacent to the other node in the combination. Here, it is preferable that the node adjacent to the other node is the node being positioning upstream or downstream in the predetermined connection order with respect to the other node.

In this apparatus, a plurality of nodes are located on the periphery of the target object by the node locator. Next, the contour, which is formed by connecting nodes at a predetermined connection order, is deformed by the contour deformation unit. Then, a internode distance is measured, by the internode distance calculator, about all combination of nodes constituting the contour excepting the internode distance between adjacent nodes. Next, a connection line is created, by the connection creator, to divide the contour when a combination of nodes whose internode distance is below a first threshold value exists. The connection line connects one of nodes in the combination with the node adjacent to the other node in the combination. Here, the node adjacent to the other node is the node being positioning upstream or downstream in the predetermined connection order with respect to the other node. Also, the first threshold value is established so that the first threshold value is set large as the distance to the target objects becomes short.

In this apparatus, it is preferable that the apparatus further including: a target region determination unit determining the region, which includes pixels of the target object, as a target region based on distance information, motion information, and edge information, each information is generated for the target object from the image. In this case it is preferable that the node locator locates a plurality of nodes on the periphery of the target region determined by the target region determination unit.

This apparatus can determine the region including pixels of the target object, by the target region determination unit, based on distance information, motion information, and edge information, each information is generated for the target object from the image. Then, the node locator locates a plurality of nodes on the periphery of the target region determined by the target region determination unit.

Here, it is preferable that the target region determination unit detects the distance wherein the number of pixels, in which motion has been detected, exceeds a second threshold value. Then, the target region determination unit regards this distance as the target distance, and obtains edge information of pixels which correspond to the image and are included in the region which has a predetermined depth in a fore-and-rear direction from the target distance. Next, the target region determination unit determines the target region based on a centerline, the center line is a pixel array in which a total number of pixels corresponding to an edge is maximum.

Additionally, the target region determination unit establishes as the target region the rectangular region which has 50 centimeter width from the centerline and has 2 meter height. Furthermore, the target region determination unit terminates the establishment of new target region, when a predetermined number of contours have been established or when new target region cannot be detected.

Still furthermore, the target region determination unit determines new target region from the region other than: the region from which the contour has already been extracted; and the region which has been judged as the region the target object is not in.

Furthermore, the target region determination unit establishes the target region further using color information obtained from the camera.

Another aspect of the present invention relates to a method for extracting at least one contour of a target object from images obtained by an image pickup of the target object by cameras. This method including the steps of: a node locating step locating a plurality of nodes on a periphery of a region which includes the target object within the image; a contour deforming step deforming the contour, which is formed by connecting nodes at a predetermined connection order, by shifting the position of each node to the position where the predefined energy function becomes minimum; an internode distance calculating step measuring internode distances about all combination of nodes constituting the contour excepting the internode distance between adjacent nodes; and a connection creating step creating a connection line to divide the contour when the combination of nodes whose internode distance is below a first threshold value exists. The connection line connects one of nodes in the combination with the node adjacent to the other node in the combination. Here, it is preferable that the node adjacent to the other node is the node being positioning upstream or downstream in the predetermined connection order with respect to the other node.

In this method: in the node locating step, a plurality of nodes are located on the periphery of a region which includes the target object; in the contour deforming step, the contour, which is formed by connecting nodes at a predetermined connection order is deformed, by shifting the position of each node to the position where the predefined energy function becomes minimum; in the internode distance calculating step, an internode distance about all combination of nodes constituting the contour is measured excepting the internode distance between adjacent nodes; and in a connection creating step, a connection line is created to divide the contour when the combination of nodes whose internode distance is below a first threshold value exists. In this case, the connection line connects one of nodes in the combination with the node adjacent to the other node in the combination, and the node adjacent to the other node is the node being positioning upstream or downstream in the predetermined connection order with respect to the other node.

The other aspect of the invention relates to a program which operates a computer for extracting at least one contour of a target object from images obtained by an image pickup of the target object by cameras, the program makes the computer to represent the functions of: a node locator locating a plurality of nodes on a periphery of a region which includes the target object within the image; a contour deformation unit deforming the contour, which is formed by connecting nodes at a predetermined connection order, by shifting the position of each node to the position where the predefined energy function becomes minimum; an internode distance calculator measuring internode distances about all combination of nodes constituting the contour V excepting the internode distance between adjacent nodes; and a connection creator creating a connection line to divide the contour when the combination of nodes whose internode distance is below a first threshold value exists. In this case, the connection line connects one of nodes in the combination with the node adjacent to the other node in the combination, and the node adjacent to the other node is the node being positioning upstream or downstream in the predetermined connection order with respect to the other node.

By this program, the computer represents the function of a node locator, a contour deformation unit, an internode distance calculator, and a connection creator. Thereby: according to the function of the node locator, a plurality of nodes are located on the periphery of a region which includes the target object; according to the function of the contour deformation unit, the contour, which is formed by connecting nodes at a predetermined connection order is deformed, by shifting the position of each node to the position where the predefined energy function becomes minimum; according to the function of the internode distance calculator, an internode distance about all combination of nodes constituting the contour is measured excepting the internode distance between adjacent nodes; and according to the function of the connection creator, a connection line is created to divide the contour when the combination of nodes whose internode distance is below a first threshold value exists. In this case, the connection line connects one of nodes in the combination with the node adjacent to the other node in the combination, and the node adjacent to the other node is preferably the node being positioning upstream or downstream in the predetermined connection order with respect to the other node.

According to the present invention, the processing to divide the contour when required can be performed much more quickly, while saving the calculation costs. Additionally, a plurality of processing for dividing the contour can be performed flexibly irrespective of the distance to the target object.

DETAILED DESCRIPTION OF THE PREFERRED EMBODIMENT

Next, the preferred embodiment of the present invention will be explained with reference to accompanying drawings.

In the following explanation, firstly, a contour extraction system which includes a contour extraction apparatus according to the present invention will be explained with reference to FIG. 1 to FIG. 7. Then, the processing in the contour extraction system will be explained with reference to FIG. 8 to FIG. 10.

(Construction of Contour Extraction System A)

Firstly, the overall construction of a contour extraction system A including a contour extraction apparatus 3 according to the present invention will be explained with reference to FIG. 1.

Figure 1:
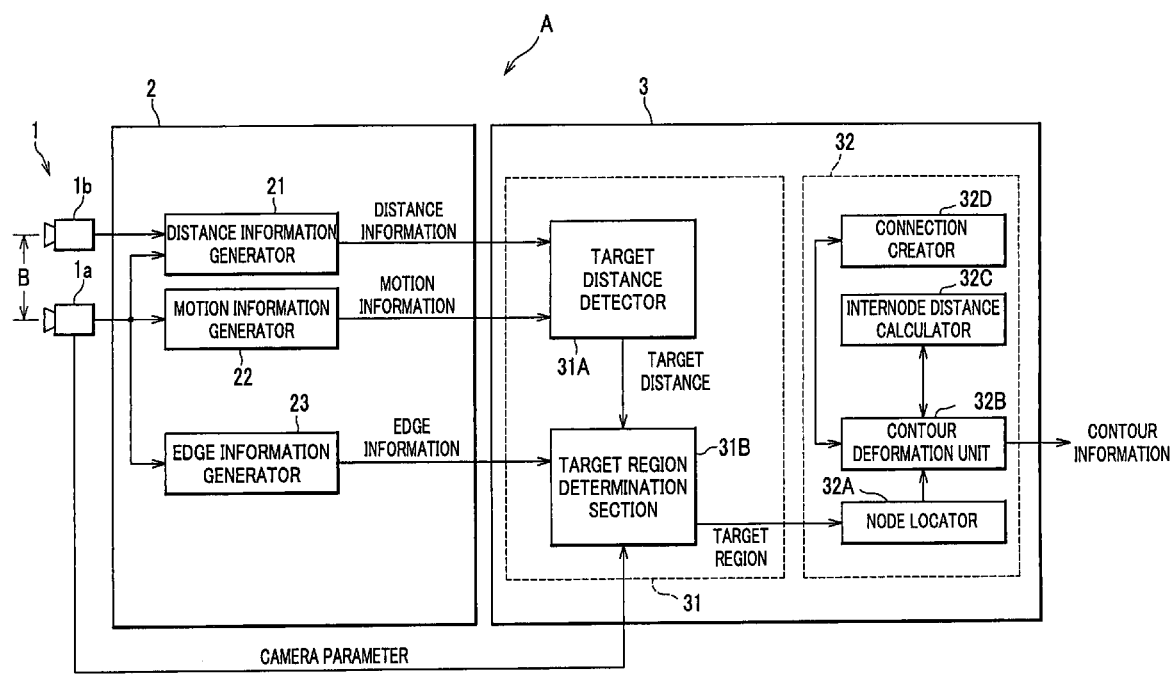
FIG. 1 is a block diagram showing the overall construction of the contour extraction system A.

FIG. 1 is a block diagram showing the overall construction of the contour extraction system A. Here, the explanation will be made on the assumption that the contour extraction system A extracts the contour of person (hereinafter referred to as "target person" as appropriate).

As shown in FIG. 1, the contour extraction system A includes, two cameras 1 (1a and 1b), an image analyzer 2, and the contour extraction apparatus 3. The cameras 1 perform an image pickup of the target person (not shown), the image analyzer 2 analyzes the image (obtained image) acquired by the cameras 1 and generates information on the basis of the result of the analysis, and the contour extraction apparatus 3 extracts the contour of the target person based on information generated by the image analyzer 2. The explanation of the cameras 1, the image analyzer 2, and the contour extraction apparatus 3 will be sequentially made below.

(Camera 1)

The cameras 1 (1*a* and 1*b*) of the present embodiment is a color CCD-camera, and a right-side camera 1*a* and left-side camera 1*b* of the camera 1 are arranged along a lateral direction (left-and-right direction). An interval B is provided between the right-side camera 1*a* and the left-side camera 1*b*, and the right-side camera 1*a* is used as a standard camera in this embodiment.

The cameras 1*a* and 1*b* perform the image pickup at a predetermined timing to obtain the image (obtained image). The obtained images of cameras 1*a* and 1*b* are stored in a frame grabber (not shown) and every frame is then simultaneously inputted to the image analyzer 2.

Here, an image calibration and an image rectification are performed on the image (obtained image), which is acquired by the camera 1, by an adjuster (not shown). Then, the image (obtained image) is inputted to the image analyzer 2. In this embodiment, a color CCD camera is adopted as the cameras 1. But, any camera which can acquire a gray value, e.g. gray value of 0 to 255 tone, can be adopted as the cameras 1.

(Image Analyzer 2)

The image analyzer 2 analyzes the image (obtained image) entered from the cameras 1*a* and 1*b*, and generates "distance information", "motion information", and "edge information". The image analyzer 2, as shown in FIG. 1, includes a distance information generator 21 for generating distance information, a motion information generator 22 for generating motion information, and an edge information generator 23 for generating edge information.

(Distance Information Generator 21)

The distance information generator 21 computes the distance to the target object from the camera 1, based on the parallax between two obtained images which were acquired at the same time by the cameras 1*a* and 1*b*. To be more precise, a parallax is computed, based on an interblock correlation method, from the obtained image (first obtained image) acquired by the camera 1*a* and the obtained image (second obtained image) acquired by the camera 2*b*.

In this embodiment, the parallax is computed for each pixel and is obtained as scalar value ranging from 0 to 32.

Here, the range of this scalar value is not limited to this, and the other range may be adoptable as this range. That is, the parallax (scalar value) may be determined in consideration of the throughput of the distance information generator 21 and the positional relation between cameras 1 (1*a* and 1*b*)

The interblock correlation method is a method for extracting the pixels (regions) indicating the same object from first obtained image and second obtained image, by comparing the specific region (e.g.8×3 pixel regions) of first obtained image with the specific region of second obtained image. By using this method, how much pixels the corresponding pixels in both images are shifting each other can be measured.

Then, distance information relating to the distance from the camera 1 to respective objects which are included in the obtained image and are indicated by each pixel is computed from the parallax obtained for each pixel using a triangular method. That is, distance information to objects indicated by each pixel is obtained. In distance information, a parallax value ranging from 0 to 32 and positional information indicating the position (x, y, z) on a real space are correlated, and thus distance information includes the information indicating this correlation about each pixel.

When the parallax value ranging from 0 to 32 is converted into the gray value with 256 step, i.e. gray value of 0 to 255 tone, the image in which gray value of pixel differs in accordance with the distance is obtained.

In this embodiment, the pixel whose gray value is "0 (zero)" denotes that the target object indicated by the pixel is in the infinite distance from the camera 1. The pixel whose gray value is "255" denotes that the target object is in proximate 80 centimeter position from the camera 1.

In this embodiment, the distance "80 centimeter" is dependent on a focal length of the camera 1, a size of pixel, and the distance between cameras 1*a* and 1*b* etc. Distance information generated for each pixel is stored in a storage (not shown) disposed within the distance information generator 21, and is then entered to the contour extraction apparatus 3.

Figure 2A:
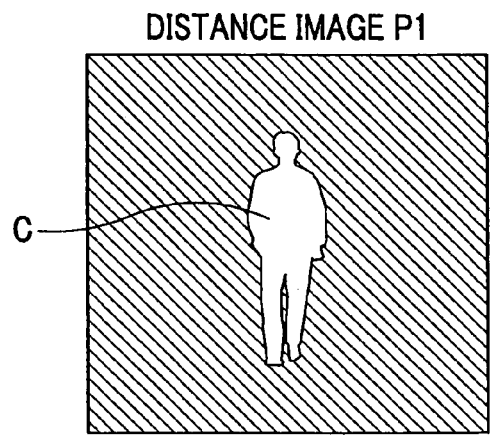
FIG. 2A is a distance image P1.

FIG. 2A is a distance image P1 indicating the obtained image using a grayscale image which is generated in accordance with distance information generated for each pixel by the distance information generator 21. Here, this distance image is generated from the obtained image obtained by the image pickup, which has been performed so that only target person C is included in the obtained image.

As shown in FIG. 2A, each pixel of the target person C is indicated using a color having a gray value of about 255. That is, each pixel of the target person C is indicated with approximate white color. Each pixel of background is indicated using a color having a gray value of zero. That is, each pixel of the back ground is indicated with black color. Here, "target person" is a person whose contour is extracted.

(Motion Information Generator 22)

The motion information generator 22 generates motion information within the image based on the difference between "obtained image (t)" and "obtained image (t+Δ1)". Here, "obtained image (t)" is the image at the time of "time t" within a series of images acquired by the camera 1*a*, and "obtained image (t+Δ1)" is the image at the time of "time t+Δt" within a series of images acquired by the camera 1*a*. Here, the camera 1*a* is used as a standard camera.

In this embodiment, to be more precise, the difference in brightness value of each corresponding pixel between "obtained image (t)" and "obtained image (t+Δ1)" is computed, and the pixel whose computed difference exceeds a threshold value T1 is extracted.

Here, the threshold value T1 is determined in consideration of: a complexity in surroundings at the time of image pickup; a number of the target object included in image; and a complexity in motion etc.

In this embodiment, for searching the threshold value most suitable for extracting finally only the target person C, a trial and error testing, e.g. the adjustment of the value of the threshold value t1, has been repeated. Then, the searched value has been adopted as the threshold value T1.

Then, the degree of difference of pixel which has been extracted is converted into the scalar value indicated by the value of any one of 0 to 255 and serves as motion information.

Figure 2B:
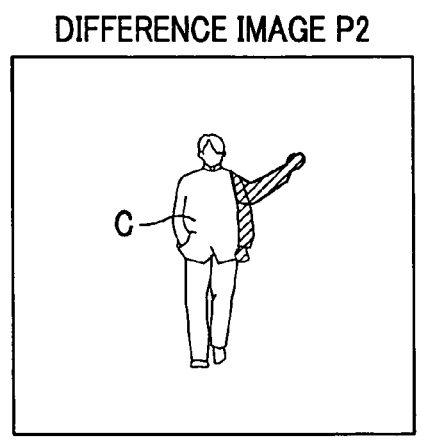
FIG. 2B is a difference image P2.

FIG. 2B is a difference image P2 in which image is indicated using a brightness value determined in accordance with the scalar value. In the case of FIG. 2B, the movement of the left arm of target person C is detected remarkably. Here, the other method which detects the motion of the moving object may be adoptable.

When the camera 1 performs an image pickup while changing the position of the camera 1, it is preferable to extract motion information by converting one of images so that the information, which relates to the motion of the background and is detected based on the change of the parameter of the camera, is canceled.

(Edge Information Generator 23)

The edge information generator 23 extracts edges in the obtained image based on shading information or color information of each pixel in the image (obtained image) acquired by the camera 1a.

To be more precise, the pixel whose brightness value differs significantly as compared to the brightness value of the adjoining pixel is searched, based on the brightness of each pixel in the obtained image. Then, a series of detected pixels are extracted as edges. In this embodiment, the information obtained by correlating the edge value to each pixel corresponds to edge information.

Figure 2C:
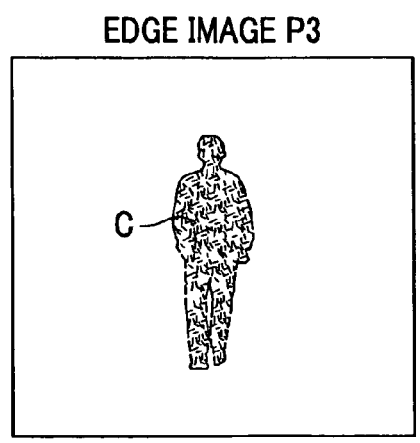
FIG. 2C is an edge image D3.

FIG. 2C is an edge image D3 in which image is indicated using brightness value which is determined in accordance with the size of the edge.

The extraction of edges is, for example, performed using Sobel operator. In this case: the multiplication of Sobel operator is performed for each pixel; the line segment, which has a predetermined difference from the adjoining line segment, is searched from each row or line; and the searched line segment is detected as an edge (vertical edge or horizontal edge). Here, Sobel operator is a coefficient matrix which has a weighting factor to the pixel in the vicinity of the specific pixel. In this embodiment, the edge detection is performed using Sobel operator. But, other method may be used for detecting edges.

Then, "distance information" and "motion information" which are generated by the image analyzer 2 are entered to a target distance detector 31A, and "edge information" is entered to a target region determination section 31B of the contour extraction apparatus 3.

(Contour Extraction Apparatus 3)

The contour extraction apparatus 3 extracts the contour of the target person C based on "distance information", "motion information", and "edge information" which are generated by the image analyzer 2.

As shown in FIG. 1, the contour extraction apparatus 3 has a target region determination unit 31, and a contour extraction unit 32.

The contour extraction apparatus 3 determines the region (target region), to which a contour extraction is performed, based on "distance information", "motion information", and "edge information". Here, target region is the region wherein target person C is supposed to be included. The contour extraction unit 32 extracts by snake method the contour of target person C from the target region which was determined by the target region determination unit 31.

(Target Region Determination Unit 31)

The target region determination unit 31 includes the target distance detector 31A and the target region determination section 31B.

The target distance detector 31A measures the distance (target distance) from the camera 1 to target person C. The target region determination section 31B determines the target region in consideration of the target distance detected by the target distance detector 31A.

(Target Distance Detector 31A)

The target distance detector 31A detects the target distance D1, which is a distance from the camera 1 to target person C, based on-distance information from the distance information generator 21 and motion information from the motion information generator 22.

To be more precise, the target distance detector 31A counts the number of the pixel, in which motion is detected, about each distance which is indicated using a scalar value ranging from 0 to 255.

Then, when the total number of the pixel corresponding to one distance exceeds a threshold value T2, the pixels, in which motion is detected and which correspond to the pixels of this distance, are detected as the pixel indicating the motion of the target person C. Here, the threshold value T2 corresponds to "second threshold value" of claims.

Here, when the total number of pixel exceeds the threshold value T2 at two or more distances, the processing, such as an contour extraction etc, may be performed while focusing on the target object in nearest distance from the camera 1. The threshold value T2 is appropriately determined so that target person C is accurately detected irrespective of the number and a motion of the target person C etc.

Figure 3A:
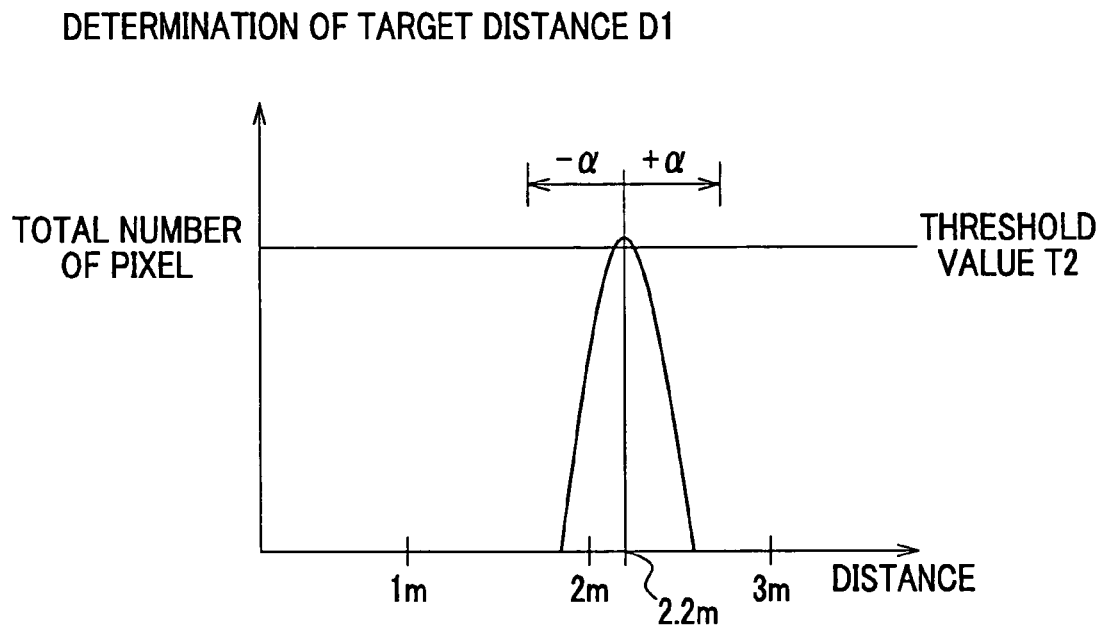
FIGS. 3A and 3B are an explanatory view for explaining the determination of the target distance.

FIG. 3A shows the case where the total number of the pixels, in which motion has been detected and which correspond to 2.2 meter distance from the camera 1, exceeds the threshold value T2.

In this embodiment, the target distance D1 detected by target distance detector 31A is entered to the target region determination section 31B. In the case of FIG. 3A, the target distance detector 31A determines the 2.2 meter as target distance D1 and supplies this target distance D1 to the target region determination section 31B.

(Target Region Determination Section 31B)

The target region determination section 31B extracts edge information of the pixels which corresponds to the target object and which is within the target distance D1±α. That is, the pixels of the target object within the region which has a predetermined depth α in a fore-and-rear direction from the target distance D1 are extracted (see FIG. 2C).

In this case, the edge information of all pixels whose distance is within the distance D1±α is extracted. Therefore, the pixels in which motion has not been detected are also extracted in addition to the pixels in which motion has been detected.

In this embodiment, the value of "α" is established at 50 centimeter in consideration of the margin and the width of a human body.

By this processing in the target region determination section 31B, edge information of only the pixels corresponding to the moving object which is supposed to be the target person C is extracted.

Figure 3B:
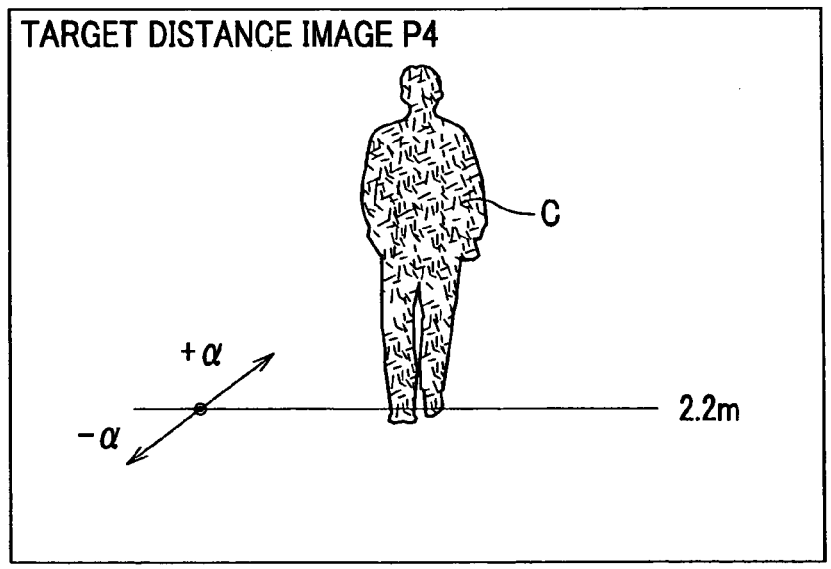

FIG. 3B shows this extraction of edge information for easily understanding visually. Here, "α" corresponds to "predetermined depth" in claims.

Next, the target region determination section 31B determines the target region having a rectangular shape in order to perform the contour extraction.

In this embodiment, since the target distance D1 (depth) has been established, the contour extraction about image information corresponding to a 3D rectangular region can be performed by establishing target region A. To be more precise, based on edge information of only pixels corresponding to the target person C, the number of the pixels in which edge is included is summed for each row (vertical line) of image frame.

Figure 4A:
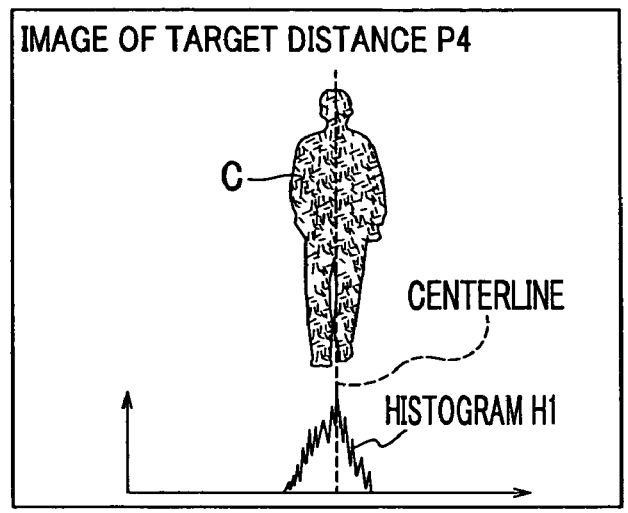
FIGS. 4A and 4B are an explanatory view for explaining the determination of the target region A.

Then, the position of pixel array (histogram H) wherein the total number of the pixel is maximum is defined as a centerline of target person C. FIG. 4A is an image view showing the state wherein the centerline has been defined.

Then, the target region determination section 31B determines the target region A based on defined centerline.

In this embodiment, 2 meter height is determined as a standard of the target region A, and the floor at the target distance D1 is determined as the bottom of the target region A.

In this embodiment, however, the target region A may be determined using the other method as long as the target object, from which contour is extracted, is included in the target region A.

Here, the recognition of floor position and the determination of the target region A can be achieved accurately by referring to camera parameters, i.e. a tilt angle, a height and etc., when the target region A is determined. Thereby, the target region A can surely include the target person C therein.

Figure 4B:
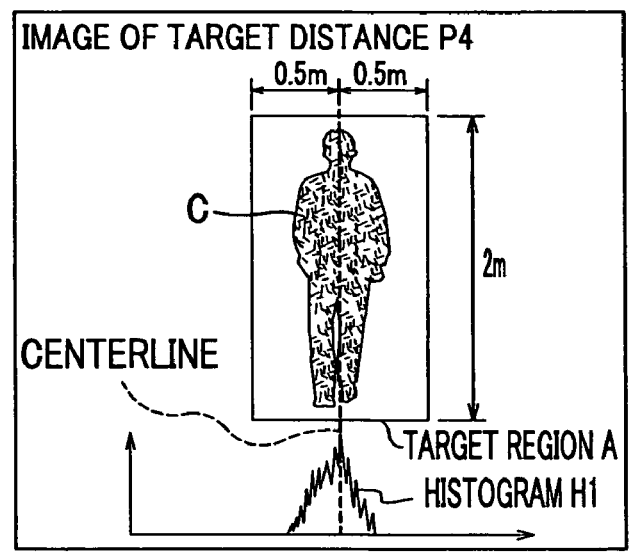

FIG. 4B shows the case where the target region A is established. As shown in FIG. 4A and FIG. 4B, the determination of centerline and target region A may be performed while indicating actually pixels including edges or while indicating histogram on image. But, this is not necessary feature of this invention.

(Contour Extraction Unit 32)

The contour extraction unit 32, as shown in FIG. 1, includes a node locator 32A, a contour deformation unit 32B, an internode distance calculator 32C, and a connection creator 32D. The node locator 32A locates nodes at regular intervals on the periphery of the target region A which was determined by the target region determination section 31B. The contour deformation unit 32B deforms the contour. The internode distance calculator 32C measures the distance between nodes configuring the contour. The connection creator 32D creates the connection line to divide the contour.

In this embodiment, the contour extraction unit 32 extracts the contour of the target person C from the target region A shown in FIG. 4B.

Here, it is preferable to explain the processing of the extraction of the contour of the target person C that is performed in the contour extraction unit 32. In the following explanation, however, the extraction of the contour will be explained with reference to FIG. 5 to FIG. 7 in order to clarify the difference with respect to the conventional contour division method which has been explained in the relevant art.

(Node Locator 32A)

The node locator 32A locates a plurality of nodes Pi(i=1, 2, ..., n) at regular intervals (see FIG. 5A) on the periphery of the target region A. Here, the contour V is formed by connecting nodes Pi one by one in order of allocation.

Positional information of these nodes Pi is inputted to the contour deformation unit 32B. Here, the number n of the node is determined for example in consideration of: the throughput ability of the contour extraction unit 3; the complexity in the shape of the target to be extracted; and the speed of the motion. In this embodiment, the number n of the node is 100.

(Contour Deformation Unit 32B)

Figure 5A:
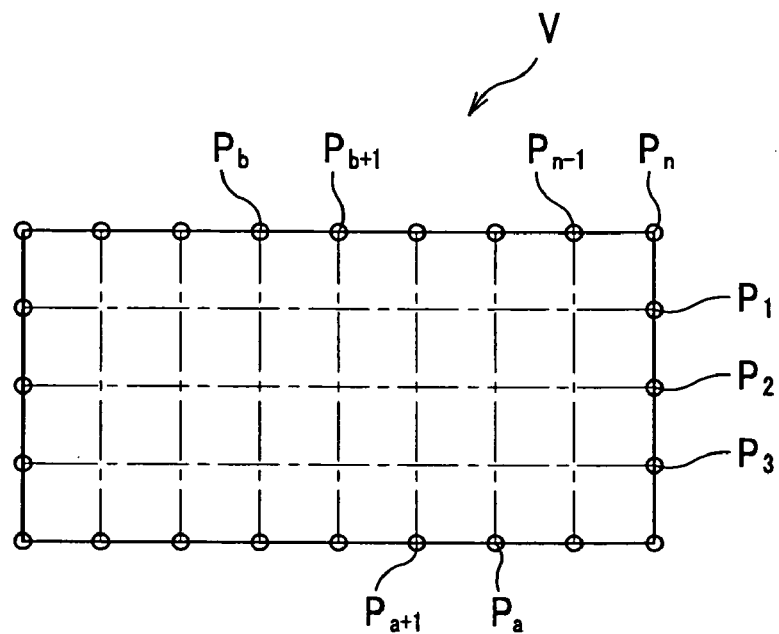
FIG. 5A is an explanatory view for explaining the arrangement of nodes.
Figure 5B:
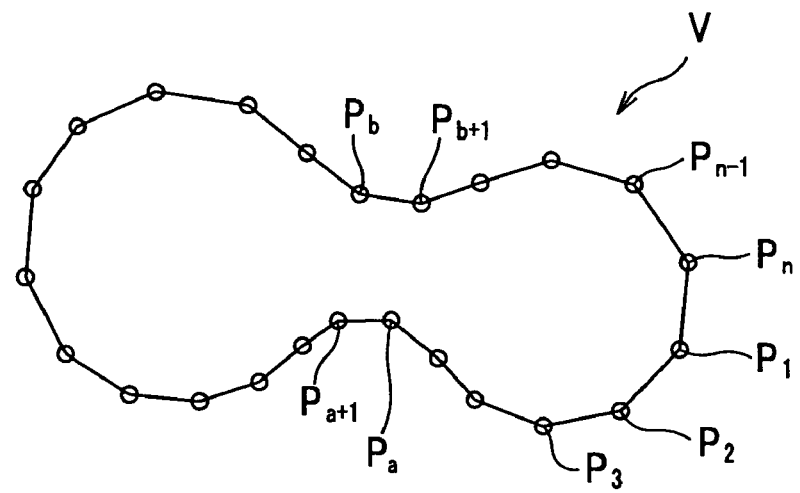
FIG. 5B is an explanatory view for explaining the deformation of the contour.

The contour deformation unit 32B deforms the contour V by shifting the position of the node Pi to the position where the predefined energy function becomes minimum (see FIG. 5B).

Here, as an example of "predefined energy function", the energy function shown by formula (1) (see the description of "RELEVANT ART") can be adoptable. The detail of each factor of formula (1) will be explained below. Here, one node comprises one pixel.

In this embodiment, to shift the position of each node Pi so that the above-described energy function becomes minimum denotes that the position of each node Pi is shifted to the position where each energy computed from formula (1) to formula (4) becomes minimum.

Here, the detail of each factor of formula (1) is as follows:

(i) the position of the node, which is within the target distance $D1 \pm \alpha$ of image and is in a region wherein the luminance gradient is large, is shifted in order to make a distinction between target object and other obstacle $$E_{image} = -|\nabla I(P_i)|^2 \quad (2)$$

(ii) the connection line connecting three consecutive nodes is approximated to a straight line in order to smooth the shape of the contour.

$$E_{spline} = W_{sp1}|P_i - P_{i-1}|^2 + W_{sp2}|P_{i+1} - 2P_i + P_{i-1}|^2 \quad (3)$$

(iii) the closed region surrounded by the contour is made as small as possible, in order to extract accurately a depressed section among the contour of the target object.

$$E_{area} = W_{area}[x_i(y_{i+1} - y_i) - (x_{i+1} - x_i)y_i] \quad (4)$$

(iv) the distance between each node is averaged in order to dispose each node in a balanced manner.

$$E_{dist} = W_{dist}|dav - |P_i - P_{i-1}||^2 \quad (5)$$

Here, $E_{int} = E_{spline} + E_{area} + E_{dist}$, and $E_{con} = 0$

[Internode Distance Calculator 32C]

The internode distance calculator 32C measures (computes) the internode distance D2 about all combination of nodes Pi constituting the contour V, which has been deformed in the contour deformation unit 32B. In this occasion, however, the combination about adjacent nodes is excepted.

Figure 6A:
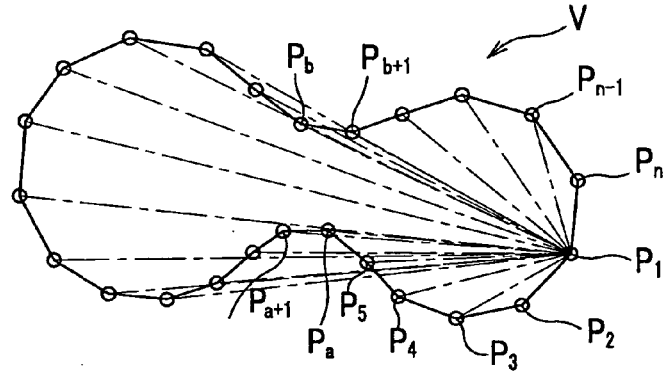
FIGS. 6A to 6C are an explanatory view for explaining the internode distance measurement.

To be more precise, as shown in FIG. 6A, the internode distance calculator 32C computes respective internode distance D2 from node $P_1$ to each node $P_3, P_4, \ldots, P_{n-1}$. Here, the internode distance to adjacent nodes, i.e. node $P_2$ and node $P_n$, is excepted.

Figure 6B:
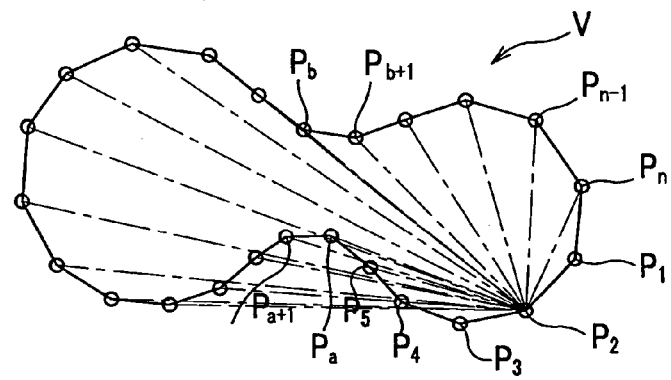

Next, as shown in FIG. 6B, the internode distance calculator 32C computes respective internode distance D2 from node $P_2$ to each node $P_4, P_5, \ldots, P_n$. Here, the internode distance to adjacent nodes, i.e. node $P_3$ and node $P_1$, is excepted.

In this occasion, the computing of the internode distance about the combination of nodes which has already been computed is not performed. Finally, the internode distance D2 from node $P_{n-2}$ to $P_n$ is computed (see FIG. 6C). Then, the measurement result in the internode distance calculator 32C is inputted to the connection creator 32D.

(Connection Establishing Unit 32D)

The connection creator 32D checks whether or not the combination of nodes Pi whose internode distance D2 is below the predetermined distance D3 exists, based on the measurement result entered from the internode distance calculator 32C. Here, the distance D3 corresponds to "first threshold value" of claims.

In this embodiment, the distance D3 is established so that the distance D3 becomes small as the distance from the camera 1 becomes large. Therefore, the accurate contour extraction can be achieved irrespective of the distance from the camera 1 to target object.

In this embodiment, since the distance to the target object is computed for each pixel, the judgment using the variable threshold value (=D3) which is suitably determined based on the distance to the target object is enabled.

In this embodiment, additionally, the distance D3 is established in accordance with the distance to the target object so that the distance D3 is below D2. Here, D2 is the internode distance with minimum value from among the internode distances of all nodes on the target object from which the contour is extracted. When extracting the contour of a person, for example, the internode distance having shortest distance is the internode distance corresponding to the width (approximate 6 centimeter) of a wrist. In this case, therefore, by establishing the distance D3 to below 6 centimeter, the extraction of two or more contours from the contour corresponding to the region of wrist can be prevented.

When the combination of nodes Pi whose internode distance D2 is below the predetermined distance D3 exists, the connection line connecting the node, which is one of nodes of the combination, with the node adjacent to the other node of combination is created. Here, the node adjacent to the other node of combination is the node which is located at a later-side (downstream) position in a connection order of nodes or the node which is located at a earlier-side (upstream) position in a connection order of nodes. By this creation of connection line, a single contour can be divided into two contours.

Figure 7A:
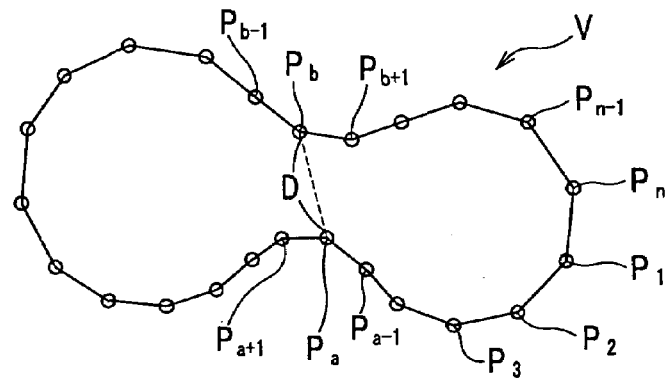
FIGS. 7A to 7C are an explanatory view for explaining the connection line creation.
Figure 7B:
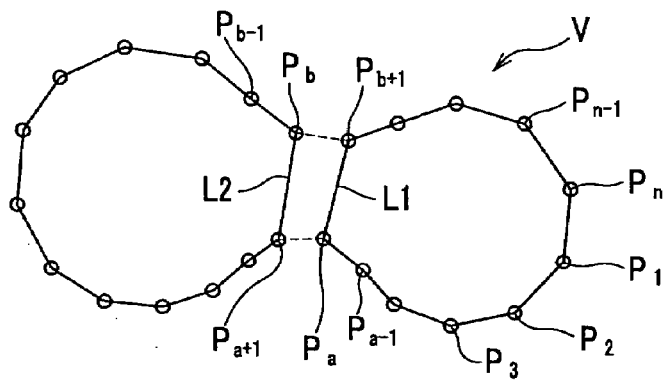
Figure 7C:
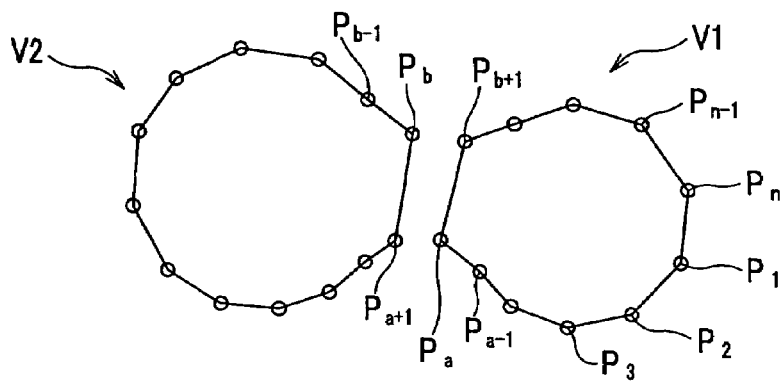

To be more precise, when the combination of nodes (node $P_a$, node $P_b$) whose internode distance D2 is below the predetermined distance D3 exists (see FIG. 7A), the connection line connecting node $P_a$ with node $P_{a+1}$ and the connection line connecting node $P_b$ with node $P_{b+1}$ are disconnected (see FIG. 7B). Then, the connection line L1 connecting node $P_a$ with node $P_{b+1}$ and the connection line L2 connecting node $P_b$ with node $P_{a+1}$ are created. Thereby, the contour V is divided into a contour V1 and a contour V2 (see FIG. 7C).

In this embodiment, the combination of nodes satisfying a predetermined requirement is searched. Next, the connection line connecting the node, which is one of nodes of the searched combination, with the node adjacent to the other node of searched combination is created, and then the contour is divided.

In this embodiment, the node adjacent to the other node $P_b$ of searched combination is the node $P_{b+1}$ of earlier-side position in a connection order of nodes. But the node adjacent to the other node $P_b$ of the combination may be the node $P_{b-1}$ of later-side position in a connection order of nodes. In this case the connection line connecting node $P_a$ with node $P_{b-1}$ is created instead of the connection line connecting node $P_a$ with node $P_{b+1}$.

In the contour extraction unit 32, as described above, contour is roughly defined by the node locator 32A and is deformed by the contour deformation unit 32B. Then, the internode distance D2 is measured about the combination of all nodes except adjacent nodes Pi about each node Pi, by the internode distance calculator 32C.

Then, the combination of nodes whose internode distance D2 is below the distance D3 is detected by the connection creator 32D, based on the measurement result by the internode distance calculator 32C. Next, the connection line L1 connecting nodes $P_a$ with $P_{b+1}$ and the connection line L2 connecting nodes $P_b$ with $P_{a+1}$ are created, and thus the contour V is divided into contours V1 and V2.

(Processing in Contour Extraction System A)

Next, the processing in the contour extraction system A will be explained with reference to block diagram, which shows the overall construction of the contour extraction system A, of FIG. 1 and a flow chart of FIG. 8 to FIG. 10.

Figure 8:
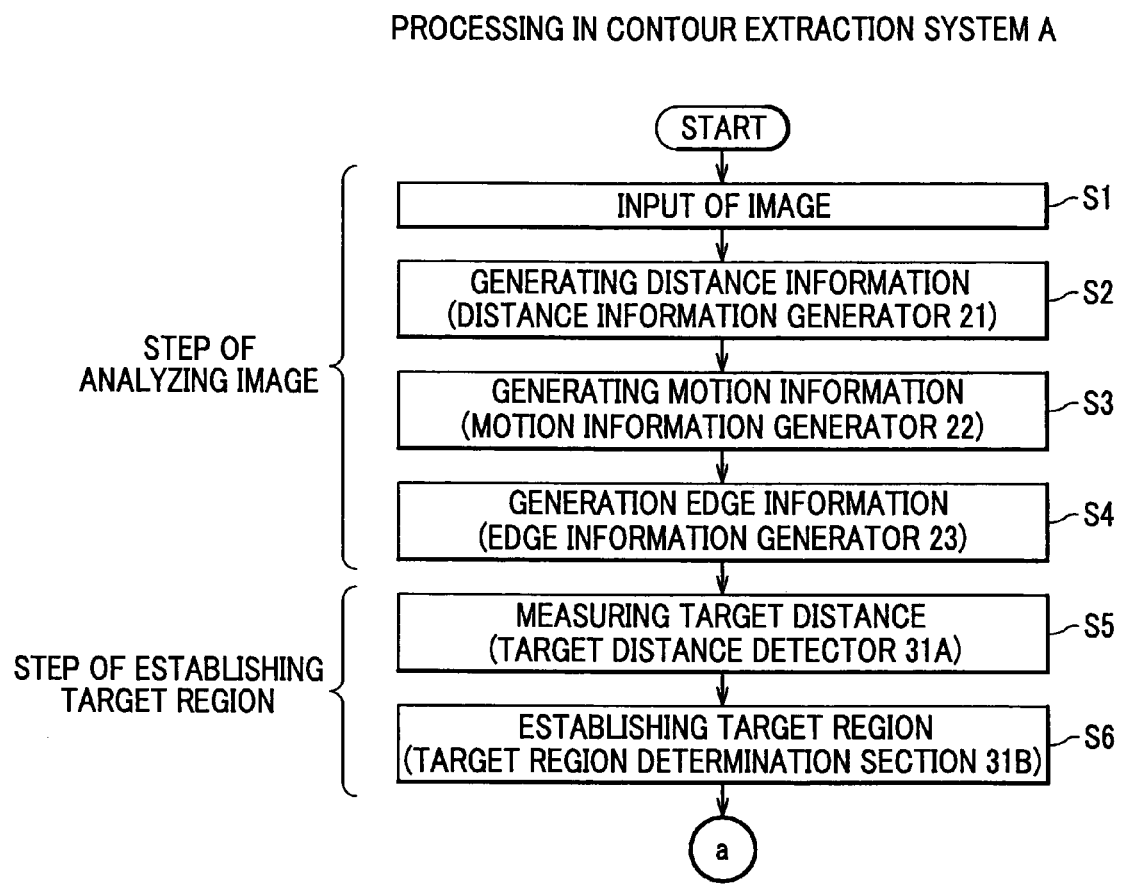
FIG. 8 is a flow chart for explaining the step of analyzing an image and the step of establishing the target region in the contour extraction system A.

Here, FIG. 8 is a flow chart for explaining the step of analyzing an image and the step of establishing the target region. FIG. 9 is a first flowchart for explaining the step of extracting the contour. FIG. 10 is a second flow chart for explaining the step of extracting the contour.

<Step of Analyzing Image>

With reference to flowchart of FIG. 8, in step S1, an obtained image is inputted to the image analyzer 2. Next, in step S2, "distance information" is generated from the obtained image by the distance information generator 21. Then, in step S3, "motion information" is generated from the obtained image by the motion information generator 22. Furthermore, in step S4, "edge information" is generated from the obtained image of step S1 by the edge information generator 23.

<Step of Establishing Target Region>

With reference to flowchart of FIG. 8, "target distance D1" is computed from "distance information" generated at step S2 and "motion information" generated at step S3, by the target distance detector 31A (step 5). Here, target distance D1 is the distance from the camera 1 to the target person C.

Then, "target region A" is established based on "target distance D1" computed in step S5 by the target region determination section 31B (step S6). Here, target region A is a region for performing a contour extraction. In this embodiment, each processing of step 2, step 3, and step 4 may be performed in parallel (simultaneously).

<Step of Extracting Contour>

Figure 9:
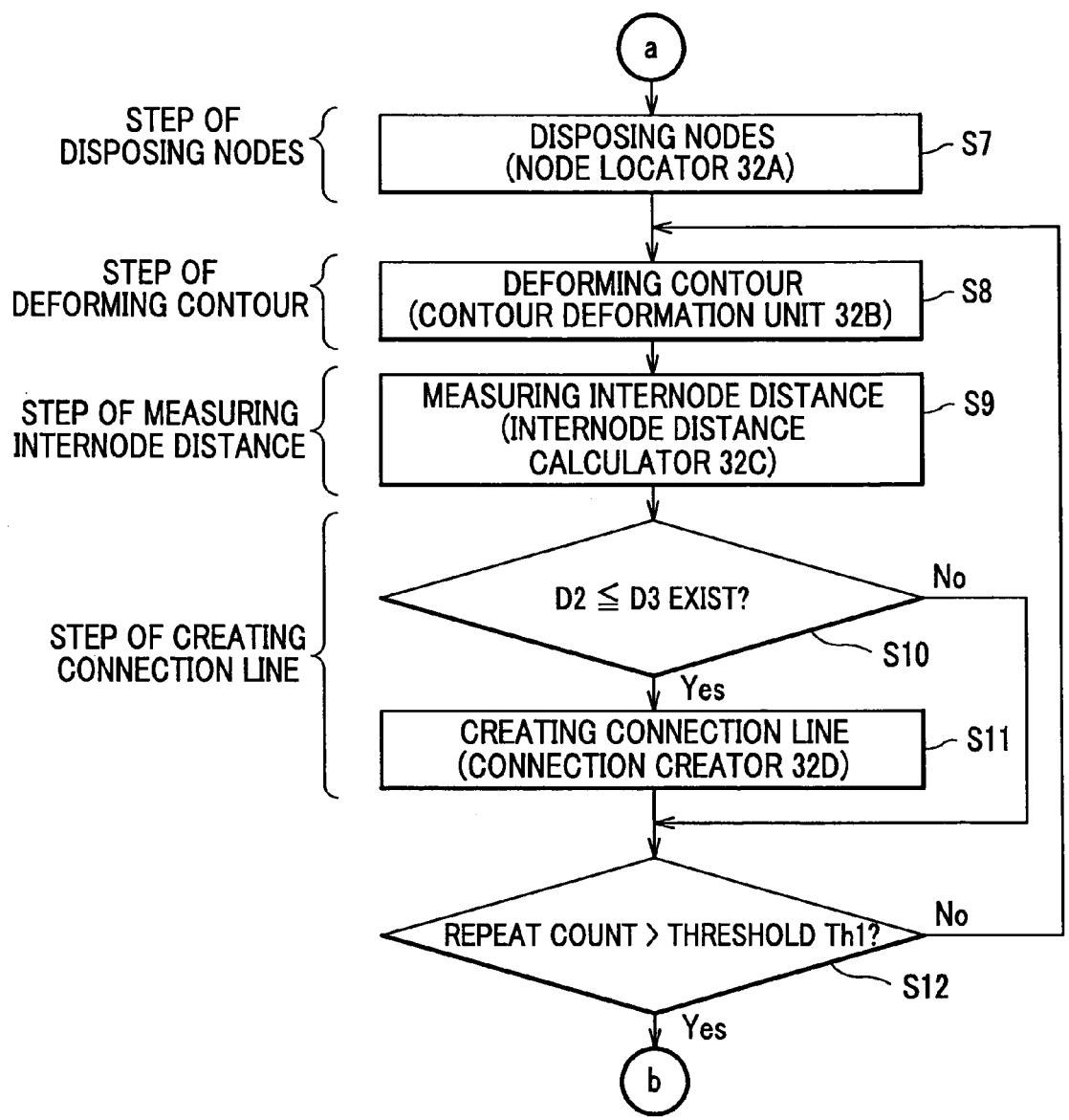
FIG. 9 is a first flowchart for explaining the step of extracting the contour in the contour extraction system A.

With reference to flowchart of FIG. 9, in step S7, a plurality of nodes Pi (i=1, 2, . . . , n) are disposed at an equal interval on the periphery of the target region A by the node locator 32A (see FIG. 5A). Here, the contour V is formed by connecting each nodes Pi in order of arrangement.

Next, in step S8, the contour V is deformed by shifting the position of each node Pi, which is disposed in step S7, so that the predetermined energy function becomes minimum (FIG. 5B).

Here, the deformation of the contour V will be explained in detail. Though it is not specific matter to this embodiment, each pixel, excepting the pixels in the periphery of the image frame, is normally surrounded by eight pixels. In this embodiment, for example, focusing on one node Pi (=pixel), the value of the predefined energy function of the case when the node is shifted to one of eight pixels surrounding the node Pi is computed for each pixel. Then, the pixel (position) at which the value of the predefined energy function becomes minimum is searched by comparing each other the obtained eight results, and the position of the node Pi is shifted to the searched position.

Next, the same processing is carried out about the node adjacent to this node Pi. In this embodiment, the same processing is carried out about all nodes, i.e. 100 nodes, configuring the contour V. The position of each node (100 nodes in this embodiment) is shifted to the new position determined by computing, and then new contour is formed by connecting one by one the adjacent nodes in order of arrangement.

Figure 6C:
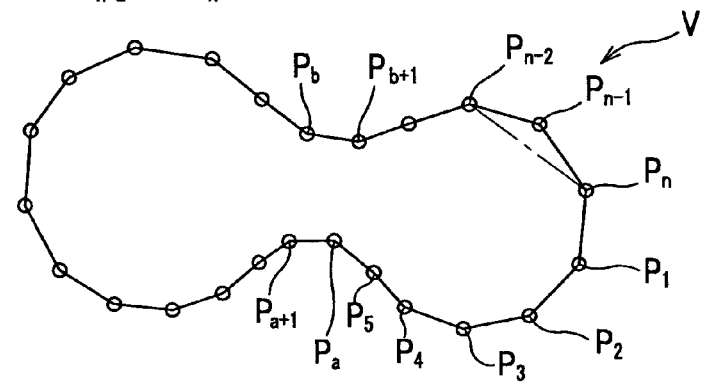

Then, in step S9, the internode distance D2 is measured about the combination of all nodes except adjacent nodes Pi about each node Pi constituting the contour V (see FIG. 6A, FIG. 6B, and FIG. 6C).

Next, in step S10, the combination of node Pi whose internode distance D2 is below the distance D3 is searched based on the measurement result in step S9. The processing goes to step S11 when such combination exists, and on the contrary the processing goes to step S12 when such combination does not exist.

To be more precise, in step S10, if the coordinates of node Pi (i=1, 2, 3, . . . , n) is denoted as $(x_i, y_i)$, it is judged that the combination of node whose internode distance D2 is below the distance D3 exists when the following formula is satisfied.

$$D2^2 = (x_a - x_b)^2 + (y_a - y_b)^2 \leq D3^2$$

In next step S11, the connection line L1 connecting node $P_a$ with node $P_{b+1}$ and the connection line L2 connecting node $P_b$ with node $P_{a+1}$ are created within the combination of nodes (node $P_a$ and node $P_b$) whose internode distance D2 is below the distance D3 (see FIG. 7B). Thereby, the contour V can be divided into contours V1 and V2 (see FIG. 7C).

Then, in step S12, it is checked how many times the processing in step S13 is repeated. The processing goes to step S13 when the repeat count of the processing in step S12 exceeds a predetermined threshold value Th1. On the contrary, if not, the processing backs to step S8.

Next, in step S13, it is checked whether or not the actual height, which is computed based on the extracted contour, exceeds a predetermined value Th2.

In this embodiment, the threshold value Th2 is established so that the extraction is suitably repeated till the contour of the target object is sufficiently extracted, based on the shape of the target object, a speed of the target object's motion, and the throughput of the contour extraction apparatus 3.

When it is judged in step S13 that the height of the contour exceeds the threshold value Th2, the processing goes to step S15.

On the contrary, if it is judged in step S13 that the height of the contour does not exceed the threshold value Th2, the processing goes to step S14.

Here, if threshold value Th2 is too high, the contour extraction of the target object cannot be achieved for a long time. On the contrary, if threshold value Th2 is too small, the contour of unwanted objects other than the target object are extracted one after another. Therefore, in this embodiment, threshold value Th2 is suitably adjusted in accordance with the height of the target object to be extracted.

In step S14, image information within the extracted contour is updated. Here, the update of the image information means that distance information within image information is made to zero. After the termination of update of image information within the contour, the processing goes to step S15.

In step S15, it is checked whether or not the number of the extracted contours (number of object) exceeds threshold value Th3. If the number of the extracted contours exceeds threshold value Th3, e.g. if five contours of person are extracted, the processing is terminated.

On the contrary, if it is judged in step S15 that the number of the extracted contours does not exceed threshold value Th3, the processing goes to step S6.

In this embodiment, threshold value Th3 may be determined in accordance with the number of the target object to be extracted simultaneously. However, if the number of the target is too large, the load to be required for computing is enlarged and this may disturb the accurate and speedy contour extraction. Therefore, threshold value Th3 must be determined in consideration of the throughput of the contour extraction apparatus 3 and the purpose of the contour extraction etc.

The above described processing of the contour extraction system A is the processing to the image which was obtained at time t. Therefore, the same processing described above is performed to the image which is obtained at time t+1, after terminating the processing of steps S1 to S15 on the image of time t.

Here, if it is judged in step S14 that image information (distance information) does not includes the target object, this image information is canceled.

Then, the processing of step S6 is performed on the remaining image region except for the region from which the contour was extracted and the region which was canceled in step S14. Here, the processing of step S6 is the processing to be performed when the result of judgment in step S15 is "No". Thereby, a plurality of contour extractions can be achieved efficiently in this invention.

Furthermore, all processing is terminated when it is judged that the target from which the contour is extracted does not exist. Here, when no motion is detected in step S3 or when the target distance D1 cannot be determined in step S5 can be an example of this case.

As described above, according to the present invention, the contour can be divided at much earlier timing, e.g. before the connection line crosses the other line or before the connection line contacts with the other connection line.

Figure 11A:
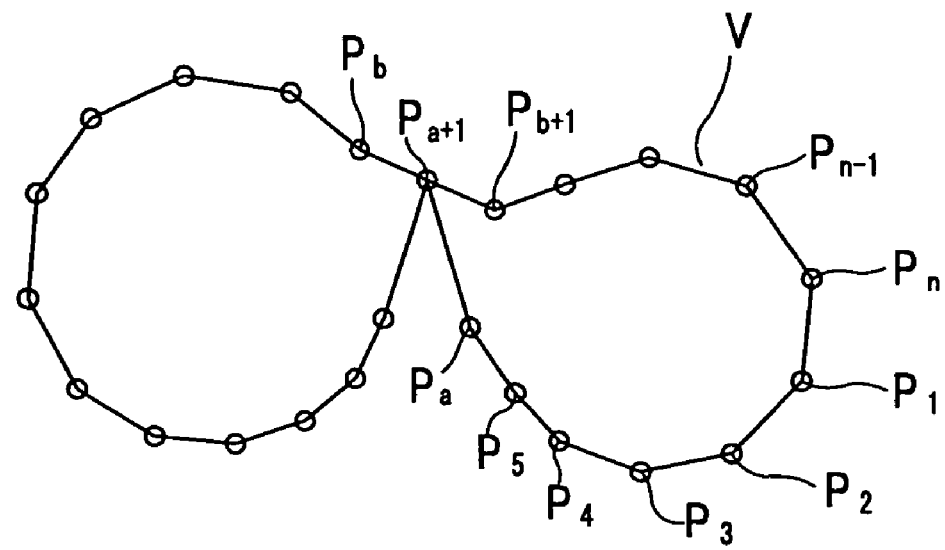
FIG. 11A and 11B are an explanatory view for explaining the conventional contour division method.
Figure 11B:
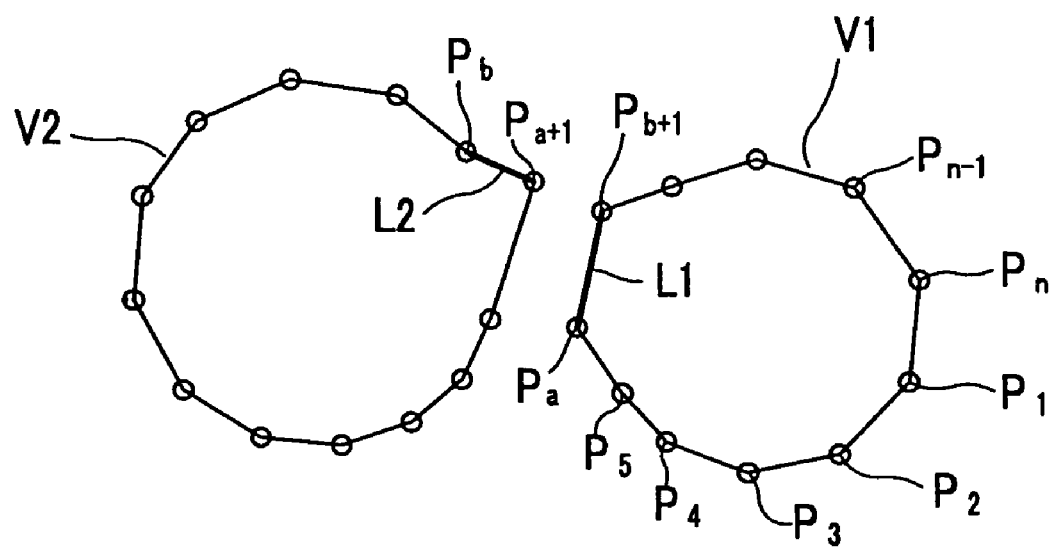
Figure 12A:
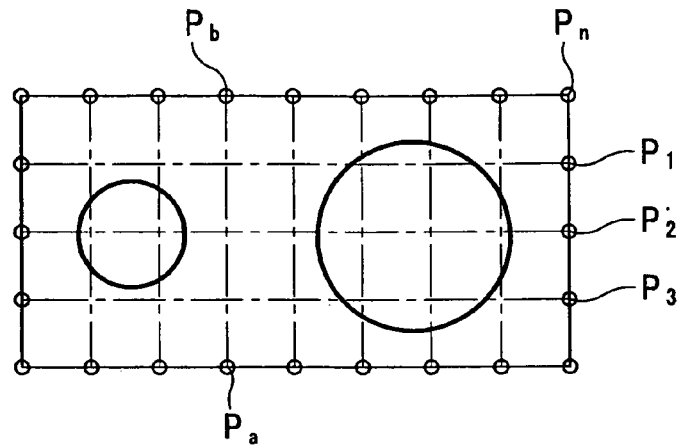
FIGS. 12A to 12C are an explanatory view for explaining the conventional contour division method.
Figure 12B:
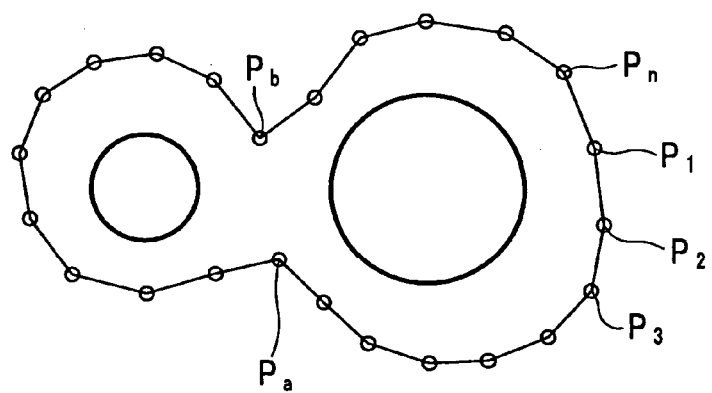
Figure 12C:
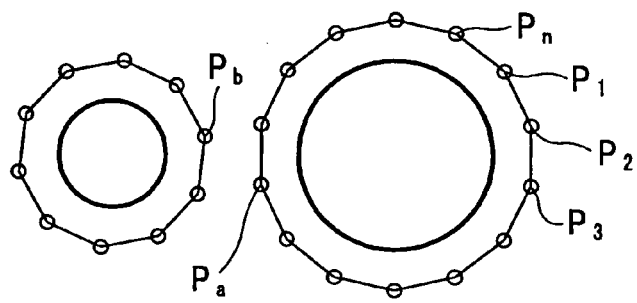

In the conventional contour dividing methods, as explained using FIG. 11A and FIG. 11B, a large amount of computing are required in order to judge the requirement of the contour division. In the case of the present invention, on the contrary, the requirement of the contour division can be judged through the simple calculation about distance which were disclosed in the explanation of step S10. Therefore, the load to be required for computing can be reduced clearly in the present invention.

To be more precise, when the number of the nodes is 100, the cost to be required for the computing is about 200 msec/frame in the case of the conventional contour division method (see patent literature 1). In the present invention, on the contrary, the cost to be required for the computing is about 100 msec/frame.

In the case of the patent literature 1, furthermore, since fixed threshold value is used, it was difficult to flexibly respond to the change of the distance to the target object. Therefore, it was difficult to perform anytime the contour extraction with accuracy when the contour extraction is performed. In the present invention, on the contrary, all pixel has each distance information and the threshold value D3 is varied in accordance with the distance of the target object. Therefore, the accurate contour extraction can be enabled irrespective of the distance to the target object.

The explanation about the contour extraction system A has been explained above. But, each elements of the image analyzer 2 and contour extraction apparatus 3 may be represented by hardware or may be program. For example, the benefits of the present invention can be obtained by running the program using a CPU and memory etc. of computer, when the function of each element of contour extraction apparatus 3 is represented by a program. In this case, the benefit is the same as the benefit obtained when each components of the contour extraction apparatus 3 are realized by a hardware.

Additionally, the fixed camera and the camera in which the direction of image pickup is controllable may be adoptable. Furthermore, the camera 1 may be fixed on the fixture or on moving object. Still furthermore, the camera 1, the image analyzer 2, and the contour extraction apparatus 3 may separately be disposed or may be provided as an integral form.

Here, if the image analyzer 2 and contour extraction apparatus 3 are separately disposed, the exchange of information between apparatuses may be performed using a fixed line or wireless. Additionally, the contour extraction may be performed using color information acquired by the camera 1. In this case, the pixel region of the human is identified by extracting a human body color region using color information. Then, the contour extraction is performed on the identified region.

Furthermore, the method, for detecting a face region of a human in consideration of an elliptical region with human body color, can be used for extracting the target. In this case, the contour extraction of a human can be achieved accurately and efficiently.

In the present invention, since contour information is obtained timely and continuously, this information has various uses. For example, a monitoring camera for monitoring a specific area and traffic volume or a camera of a bipedal walking robot etc. can be example of this use.

According to the present invention, a plurality of contour extractions can be performed simultaneously while reducing the load to be required for computing. When the present invention is applied for the monitoring camera in a room, only the image of the target to be monitored can be stored for a long time while reducing the total information amount by canceling the information other than the image of the target to be monitored.

In the case of the bipedal walking robot, a complicated processing, i.e. a bipedal-walking, a outside recognition, a response to the command from a human, has to be performed within a short period of time.

In the present invention, since the load to be required for computing can be reduced and the division of the contour is performed at earlier timing as appropriate, the response of the bipedal walking robot can be improved remarkably in an actual use condition.

Figure 10:
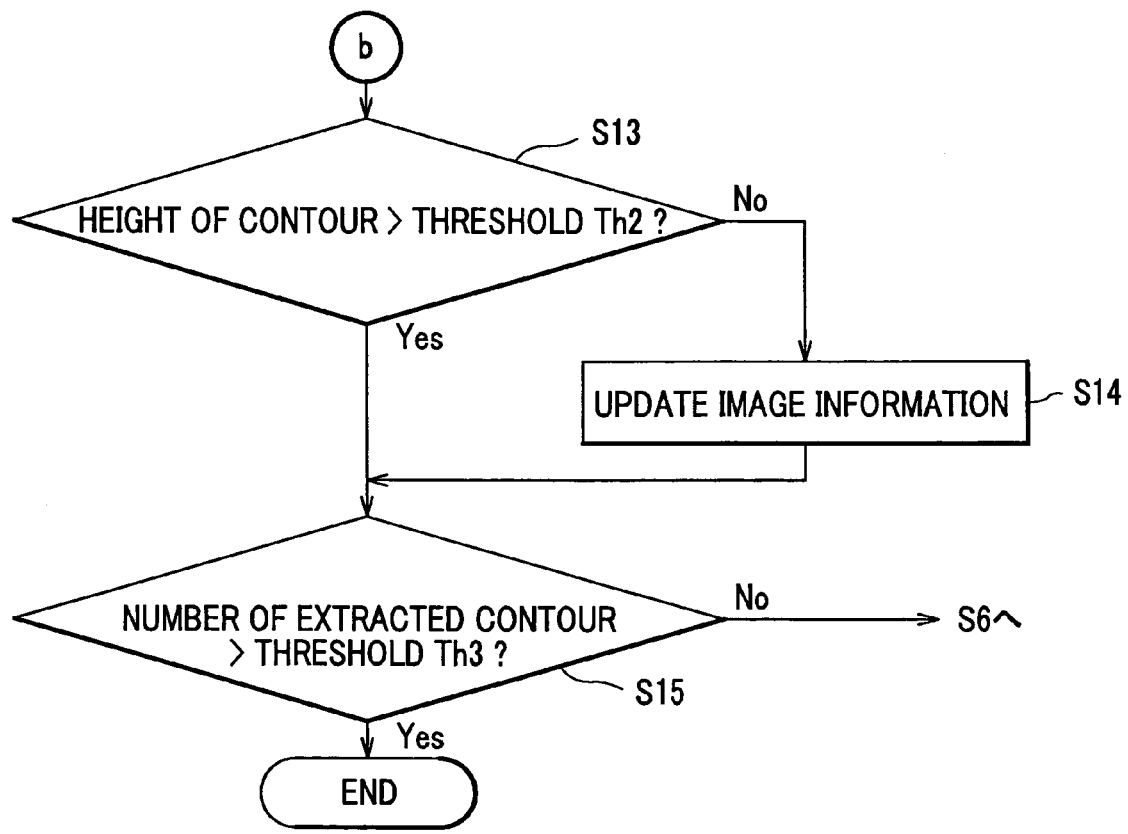
FIG. 10 is a second flow chart for explaining the step of extracting the contour in the contour extraction system A.

Here, when the contour of the target object, which are extracted continuously, is indicated on the image on a display (not shown), an administrator of the contour extraction system can recognize the existence within the image of an obstacle and can adjust respective threshold values which were explained using FIG. 8 to FIG. 10.

What is claimed is:

1. A contour extraction apparatus extracting at least one contour of a target object from images obtained by an image pickup of the target object by cameras, the contour extraction apparatus comprising:
    a node locator locating a plurality of nodes on a periphery of a region, which includes the target object, within the image;
    a contour deformation unit deforming the contour, which is formed by connecting nodes at a predetermined connection order, by shifting the position of each node to the position where a predefined energy function becomes minimum;
    an internode distance calculator measuring internode distances about all combination of nodes constituting the contour excepting the internode distance between adjacent nodes; and
    a connection creator creating a connection line to divide the contour when a combination of nodes whose internode distance is below a first threshold value exists, wherein
    the connection line connects one of nodes in the combination with the node adjacent to the other node in the combination,
    the node adjacent to the other node is the node being positioning upstream or downstream in the predetermined connection order with respect to the other node, and
    the first threshold value is determined in accordance with the distance to the target object.

2. A contour extraction apparatus for extracting at least one contour of a target object from images obtained by an image pickup of the target object by cameras, the contour extraction apparatus comprising:
    a node locator locating a plurality of nodes on a periphery of a region, which includes the target object, within the image:
    a contour deformation unit deforming the contour, which is formed by connecting nodes at a predetermined connection order, by shifting the position of each node to the position where a predefined energy function becomes minimum;
    an internode distance calculator measuring internode distances about all combination of nodes constituting the contour excepting the internode distance between adjacent nodes; and
    a connection creator creating a connection line to divide the contour when a combination of nodes whose internode distance is below a first threshold value exists, wherein
    the connection line connects one of nodes in the combination with the node adjacent to the other node in the combination,
    the node adjacent to the other node is the node being positioning upstream or downstream in the predetermined connection order with respect to the other node, and
    the first threshold value is determined in accordance with the distance to the target object and is set large as the distance to the target object becomes short.

3. A contour extraction apparatus according to claim 2, further comprising:
    a target region determination unit determining the region, which includes pixels of the target object, as a target region based on distance information, motion information, and edge information, each information is generated for the target object from the image, wherein
    the node locator locates a plurality of nodes on a periphery of the target region determined by the target region determination unit.

4. A contour extraction apparatus according to claim 3, wherein
    the target region determination unit: detects as a target distance the distance wherein a total number of pixel in which motion has been detected exceeds a second threshold value; obtains edge information of pixels corresponding to the image within a region which has a predetermined depth in a fore-and-rear direction from the target distance; and determines the target region based on a centerline, the center line is a pixel array in which a total number of pixels corresponding to an edge is maximum, the pixel corresponding to the edge is searched based on edge information.

5. A contour extraction apparatus according to claim 4 wherein
    the target region determination unit establishes as the target region the rectangular region which has 2 meter height and has 50 centimeter width in a left-and-right direction from the centerline.

6. A contour extraction apparatus according to claim 3, wherein
    the target region determination unit terminates the establishment of new target region, when a predetermined number of contours have been established or when new target region cannot be detected.

7. A contour extraction apparatus according to 6, wherein
    the target region determination unit determines new target region from the region other than the region from which the contour has been extracted and the region which has been judged as the region the target object is not in.

8. A contour extraction apparatus according to claim 3, wherein
    the target region determination unit establishes the target region further using color information obtained from the camera.

9. A method for extracting at least one contour of a target object from images obtained by an image pickup of the target object by cameras, the method comprising the steps of:
- a node locating step locating a plurality of nodes on a periphery of a region, which includes the target object, within the image;
- a contour deforming step deforming the contour, which is formed by connecting nodes at a predetermined connection order, by shifting the position of each node to the position where a predefined energy function becomes minimum;
- an internode distance calculating step measuring internode distances about all combination of nodes constituting the contour excepting the internode distance between adjacent nodes; and
- a connection creating step creating a connection line to divide the contour when a combination of nodes whose internode distance is below a first threshold value exists, wherein
- the connection line connects one of nodes in the combination with the node adjacent to the other node in the combination,
- the node adjacent to the other node is the node being positioning upstream or downstream in the predetermined connection order with respect to the other node, and
- the first threshold value is determined in accordance with the distance to the target object.

10. A computer program encoded on a computer-readable medium for extracting at least one contour of a target object from images obtained by an image pickup of the target object by cameras, the program controlling the functions comprising:
- a node locator locating a plurality of nodes on a periphery of a region, which includes the target object, within the image;
- a contour deformation unit deforming the contour, which is formed by connecting nodes at a predetermined connection order, by shifting the position of each node to the position where the predefined energy function becomes minimum;
- an internode distance calculator measuring internode distances about all combination of nodes constituting the contour excepting the internode distance between adjacent nodes; and
- a connection creator creating a connection line to divide the contour when a combination of nodes whose internode distance is below a first threshold value exists, wherein
- the connection line connects one of nodes in the combination with the node adjacent to the other node in the combination,
- the node adjacent to the other node is the node being positioning upstream or downstream in the predetermined connection order with respect to the other node, and
- the first threshold value is determined in accordance with the distance to the target object.

* * * * *